United States Patent [19]
Rapp et al.

[11] Patent Number: 5,932,347
[45] Date of Patent: Aug. 3, 1999

[54] MINERAL FIBER COMPOSITIONS

[75] Inventors: Charles F. Rapp; Peter B. McGinnis, both of Newark, Ohio

[73] Assignee: Owens Corning Fiberglas Technology, Inc., Summit, Ill.

[21] Appl. No.: 08/778,419

[22] Filed: Dec. 31, 1996

Related U.S. Application Data

[63] Continuation-in-part of application No. 08/741,849, Oct. 31, 1996, abandoned.

[51] Int. Cl.$^6$ .............................. C03B 37/00; C03C 13/06
[52] U.S. Cl. ......................... 428/392; 428/364; 428/375; 428/391; 501/35; 501/36; 501/69; 501/70; 501/95
[58] Field of Search .................................. 428/364, 392, 428/391; 501/35, 36, 38, 55, 68, 69, 70, 72, 95, 104, 105

[56] References Cited

U.S. PATENT DOCUMENTS

| | | |
|---|---|---|
| Re. 29,388 | 9/1977 | Atkinson . |
| 2,113,303 | 4/1938 | Kiefer . |
| 2,576,312 | 11/1951 | Minnick . |
| 2,693,668 | 11/1954 | Slayter . |
| 2,877,124 | 3/1959 | Welsch . |
| 2,882,173 | 4/1959 | Welsch . |
| 3,013,888 | 12/1961 | Lajarte . |
| 3,060,041 | 10/1962 | Loewenstein . |
| 3,253,948 | 5/1966 | Tiede . |
| 3,328,142 | 6/1967 | Levecque . |
| 3,736,162 | 5/1973 | Chvalovsky . |
| 3,854,986 | 12/1974 | Chvalovsky et al. . |
| 3,861,927 | 1/1975 | Kimura et al. . |
| 4,036,654 | 7/1977 | Yale et al. . |
| 4,090,882 | 5/1978 | Rauschenfels . |
| 4,095,986 | 6/1978 | Matsuda et al. . |
| 4,243,421 | 1/1981 | Kume . |
| 4,277,286 | 7/1981 | Boyd et al. . |
| 4,312,952 | 1/1982 | Carbol . |
| 4,325,724 | 4/1982 | Froberg . |
| 4,330,628 | 5/1982 | Cockram et al. . |
| 4,381,347 | 4/1983 | Carbol . |
| 4,396,722 | 8/1983 | Rapp . |
| 4,443,550 | 4/1984 | Kume . |
| 4,510,252 | 4/1985 | Potter . |
| 4,552,850 | 11/1985 | Partington et al. . |
| 4,615,988 | 10/1986 | LeMoigne . |
| 4,652,535 | 3/1987 | Mackenzie et al. . |
| 4,756,736 | 7/1988 | Fenton . |
| 4,835,122 | 5/1989 | Chopinet . |
| 5,055,428 | 10/1991 | Porter . |
| 5,108,957 | 4/1992 | Cohen et al. . |
| 5,250,488 | 10/1993 | Thelohan . |
| 5,284,807 | 2/1994 | Komori et al. . |
| 5,332,698 | 7/1994 | Nyssen et al. . |
| 5,401,693 | 3/1995 | Bauer et al. . |
| 5,558,942 | 9/1996 | Itoh et al. . |
| 5,583,080 | 12/1996 | Goldberg et al. . |
| 5,614,449 | 3/1997 | Jensen . |

FOREIGN PATENT DOCUMENTS

| | | |
|---|---|---|
| 412878A1 | 2/1991 | European Pat. Off. . |
| 525816 | 2/1993 | European Pat. Off. . |
| 588251 | 4/1997 | European Pat. Off. . |
| 2662687 | 1/1990 | France . |
| 2404623 | 8/1974 | Germany . |
| 4417230 | 11/1995 | Germany . |
| 4417231 | 11/1995 | Germany . |
| 2220654 | 7/1988 | United Kingdom . |
| WO89/12032 | 12/1989 | WIPO . |
| WO90/02713 | 3/1990 | WIPO . |
| WO92/06047 | 4/1992 | WIPO . |
| WO92/09536 | 6/1992 | WIPO . |
| WO93/02977 | 2/1993 | WIPO . |
| WO93/22251 | 11/1993 | WIPO . |
| WO94/14717 | 7/1994 | WIPO . |
| WO94/14718 | 7/1994 | WIPO . |
| WO95/01941 | 1/1995 | WIPO . |
| WO95/31411 | 11/1995 | WIPO . |
| WO95/32925 | 12/1995 | WIPO . |
| WO95/32926 | 12/1995 | WIPO . |
| WO95/32927 | 12/1995 | WIPO . |
| WO95/35265 | 12/1995 | WIPO . |
| WO96/00196 | 1/1996 | WIPO . |
| WO96/16912 | 6/1996 | WIPO . |
| WO96/16913 | 6/1996 | WIPO . |

OTHER PUBLICATIONS

Russell M. Potter and Stephanie M. Mattson, "Glass Fiber Dissolution in a Physiological Saline Solution", Jun. 5, 1990, International Journal of Glass Science and Technology, vol. 64 (1991).

*Primary Examiner*—William Krynski
*Assistant Examiner*—J. M. Gray
*Attorney, Agent, or Firm*—Stephen W. Barns

[57] ABSTRACT

Mineral fiber compositions are disclosed which, in a first embodiment, include the following components, indicated in weight percents: about 54 to about 70 percent $SiO_2$, about 0 to about 4 percent $Al_2O_3$, about 0 to about 6 percent $Na_2O$, about 0 to about 6 percent $K_2O$, about 0 to about 6 percent MgO, about 10 to about 28 percent CaO, about 6 to about 17 percent total iron as FeO, and about 0 to about 5 percent $TiO_2$, wherein the total weight percent of $SiO_2$ and $Al_2O_3$ ranges from about 56 percent to about 72 percent, the total weight percent of MgO and CaO ranges from about 12 percent to about 28 percent, the total weight percent of $Na_2O$ and $K_2O$ does not exceed 6 percent, and the total weight percent of all components, including trace elements, if any, is 100 percent. In a second embodiment, the compositions include the following components, indicated in weight percents: about 50 to about 68 percent $SiO_2$, about 0 to about 4 percent $Al_2O_3$, about 0 to about 6 percent $K_2O$, about 0 to about 6 percent $Na_2O$, about 0 to about 10 percent MgO, about 10 to about 28 percent CaO, about 6 to about 16 percent total iron as FeO, about 0 to about 5 percent $TiO_2$, and about 0.5 to about 12 percent $ZrO_2$, wherein the total weight of $Na_2O$ and $K_2O$ does not exceed 6 percent and the total weight of all components, including trace elements, if any, is 100 percent.

27 Claims, No Drawings

MINERAL FIBER COMPOSITIONS

CROSS-REFERENCE TO RELATED APPLICATIONS

This application is a continuation-in-part of U.S. patent application No. 08/741,849, filed Oct. 31, 1996 now abandoned.

TECHNICAL FIELD

This invention relates to mineral fiber compositions and, more particularly, to insulation products formed from fibers made from such compositions.

BACKGROUND OF THE INVENTION

Mineral fiber insulation is well known and has been a commercial product for an extended period of time. Such insulation typically is made from a nonwoven network of intertwined fibers that have been fiberized from a melt, by one of several processes discussed below, and that are held together by a binder. The binder may be any suitable material but quite commonly is a phenol-formaldehyde resin or a ureaformaldehyde resin. A conveyor typically collects the binder-coated fibers in the form of a blanket and the blanket is heat cured to produce the final insulation product. Insulation materials of various densities can be produced by varying the conveyor speed and the thickness of the cured insulation.

Glass wools are generally prepared by a rotary process, whereby a glass melt is dropped into a "spinner" having a peripheral wall having a multitude of holes therein, through which the glass is forced by centrifugal force to form fibers, which process gives excellent fiber yields, i.e., low "shot" contents and excellent insulating properties. However, the glasses used to produce these fibers have low softening temperatures so that their use is generally limited to only moderately high service temperatures.

Mineral wools, on the other hand, have higher softening and use temperatures and thus can typically be used in higher temperature environments. However, these compositions generally have forming temperatures which are too high for rotary fiberizing. Mineral wools are usually formed by external centrifuge processes that produce a lower fiber yield and a higher shot content than the rotary process. An example of a mineral wool intended to be fiberized by an external centrifuge process is disclosed in WO 96/00196.

Previously in the art mineral wool compositions have been reported which allegedly can be formed into fiber by a rotary process. (See International Patent Application Publications WO 95/01941 and WO 93/02977, U.S. Pat. No. 5,554,324, and European Patent Application EP 583 792). However, these compositions all contain high amounts of $Na_2O$, $K_2O$, and $B_2O_3$, which can negatively affect the high temperature performance of the fiber, or high amounts of $Al_2O_3$, which can decrease the biosolubility of the fiber.

Although mineral fibers have not been linked to disease in humans, it has become desirable to increase the biosolubility of mineral fibers. One would expect that increasing the solubility of mineral fibers would further decrease the time the fibers remain in a lung, if they were to be inhaled, and thus that the dissolution rate of mineral fibers in a saline solution having a composition similar to that existing in a human lung would be a good indicator of the biosolubility of such fibers. This dissolution rate can be improved by altering the chemical composition of a fiber. Previously in the art, it was thought that these alterations could not be made without impairing other properties of the fibers necessary for commercial purposes.

Accordingly, it is an object of the present invention to provide an improved mineral fiber composition and an improved mineral fiber formed from such composition.

Another object of the present invention is to provide a mineral fiber useable in relatively high temperature environments.

A further object of the present invention is to provide a mineral fiber composition that may be formed into a mineral fiber in a rotary fiberizing process.

Yet another object of the present invention is to provide a mineral fiber that is relatively biosoluble, yet sufficiently durable.

More preferably, it is an object of the present invention to provide a mineral fiber composition that may be formed into a mineral fiber in a rotary fiberizing process, which fiber is usable in high temperature environments and is sufficiently durable.

More preferably, it is an object of the present invention to provide a mineral fiber composition that may be formed into a mineral fiber in a rotary fiberizing process, which fiber is usable in high temperature environments and is relatively biosoluble, yet sufficiently durable.

SUMMARY OF THE INVENTION

The above objects as well as other objects not specifically enumerated are accomplished by a mineral fiber composition according to a first embodiment of the present invention, which includes the following components, indicated in weight percents: about 54 to about 70 percent $SiO_2$, about 0 to about 4 percent $Al_2O_3$, about 0 to about 6 percent $Na_2O$, about 0 to about 6 percent $K_2O$, about 0 to about 6 percent MgO, about 10 to about 28 percent CaO, about 6 to about 17 percent total iron as FeO, and about 0 to about 5 percent $TiO_2$, wherein the total weight percent of $SiO_2$ and $Al_2O_3$ ranges from about 56 percent to about 72 percent, the total weight percent of MgO and CaO ranges from about 12 percent to about 28 percent, the total weight percent of $Na_2O$ and $K_2O$ does not exceed 6 percent, and the total weight percent of all components, including trace elements, if any, is 100 percent.

The above objects are also accomplished by a mineral fiber composition according to a second embodiment of the present invention, which includes the following components, indicated in weight percents: about 50 to about 68 percent $SiO_2$, about 0 to about 4 percent $Al_2O_3$, about 0 to about 6 percent $K_2O$, about 0 to about 6 percent $Na_2O$, about 0 to about 10 percent MgO, about 10 to about 28 percent CaO, about 6 to about 16 percent total iron as FeO, about 0 to about 5 percent $TiO_2$, and about 0.5 to about 12 percent $ZrO_2$, wherein the total weight of $Na_2O$ and $K_2O$ does not exceed 6 percent and the total weight of all components, including trace elements, if any, is 100 percent.

The above objects are further accomplished by mineral wool insulation including mineral fibers having a composition according to the first embodiment of the present invention, and by a mineral wool insulation including mineral fibers having a composition according to the second embodiment of the present invention.

DETAILED DESCRIPTION AND PREFERRED EMBODIMENTS OF THE INVENTION

As will be discussed more fully below, mineral fiber compositions according to the present invention have relatively lower liquidus temperatures and relatively higher viscosities than a standard rockwool, thus allowing rotary fiberization thereof. For these compositions, the liquidus temperatures are generally less than about 2200° F. (1204° C.), and, more preferably, less than about 2180° F. (1193° C.). These relatively lower liquidus temperatures are due at least in part to the relatively low MgO content of the mineral fiber compositions. The viscosity of the compositions generally falls between about 150 and about 1000 poise at 2250° F. (1232° C.) and, more preferably, between about 200 and 800 poise at 2250° F. (1232° C.). With these properties, the compositions of this invention have sufficiently low liquidus temperatures and adequate viscosity ranges to allow these compositions to be used in a typical rotary fiberizing apparatus.

The compositions of the present invention are preferably resistant to high temperature degradation, such that they form wool products that can be used in relatively high temperature environments. The compositions of the present invention also preferably produce fibers which are relatively biosoluble, yet sufficiently durable to maintain a wool product's physical integrity over many years in the location at which it is installed. Such fibers preferably should not only be fairly inert to moisture attack at the installation site, but also capable of dissolving in a physiological medium, such as human lung fluid.

Like a standard rockwool composition described below, the compositions of the present invention have a relatively low $Na_2O+K_2O$ content to help give the rotary fiberized product relative good high temperature resistance. However, the compositions of the present invention include, relative to a standard rockwool, moderately increased amounts of $SiO_2$, greatly reduced amounts of $Al_2O_3$, and an increased $Fe_2O_3$ content. In one embodiment of the invention, the compositions can also include an increased $ZrO_2$ content. As discussed more fully below, these changes can be implemented in varying degrees to produce compositions that are not only fiberizable by rotary methods, but also, in varying degrees, are resistant to high temperatures, durable, and preferably, relatively biosoluble.

A mineral fiber composition according to a first embodiment of the present invention include the following components, in about the indicated weight percents (as is standard practice in the art, the components are reported as oxides, even though essentially no such individual crystals are present):

| Component | Weight Percent |
|---|---|
| $SiO_2$ | 54–70 |
| $Al_2O_3$ | 0–4 |
| $Na_2O$ | 0–6 |
| $K_2O$ | 0–6 |
| MgO | 0–6 |
| CaO | 10–28 |
| Total Iron as FeO* | 6–17 |
| $TiO_2$ | 0–5 |
| $SiO_2 + Al_2O_3$ | 56–72 |
| $Na_2O + K_2O$ | 0–6 |
| MgO + CaO | 12–28 |

* Iron is present as both $Fe^{2+}$ and $Fe^{3+}$ or in oxide form as FeO and $Fe_2O_3$. Since the fraction of $Fe^{2+}$ and $Fe^{3+}$ is unknown, the total of both iron oxides is expressed herein as FeO.

Preferred ranges for components of the composition according to the first embodiment of the invention are as follows, in about the indicated weight percents:

| Component | Weight Percent |
|---|---|
| $SiO_2$ | 56–68 |
| $Al_2O_3$ | 0–3 |
| $Na_2O$ | 0–5 |
| $K_2O$ | 0–5 |
| MgO | 1–6 |
| CaO | 10–25 |
| Total Iron as FeO | 8–16 |
| $TiO_2$ | 0–4 |
| $SiO_2 + Al_2O_3$ | 58–71 |
| $K_2O + Na_2O$ | 0–5 |
| MgO + CaO | 14–26 |

More preferred ranges for components of the composition according to the first embodiment of the invention are as follows, in about the indicated weight percents:

| Component | Weight Percent |
|---|---|
| $SiO_2$ | 58–65 |
| $Al_2O_3$ | 0–3 |
| $Na_2O$ | 0–4 |
| $K_2O$ | 0–4 |
| MgO | 2–5 |
| CaO | 11–20 |
| Total Iron as FeO | 9–13 |
| $TiO_2$ | 0–3 |
| $SiO_2 + Al_2O_3$ | 60-68 |
| $Na_2O + K_2O$ | 0–4 |
| MgO + CaO | 17–22 |

Comparative Example 1

The table below shows the approximate weight percent composition and some properties of a commercial rockwool, i.e., Composition A, as well as the same for seven mineral wool compositions, i.e., Compositions B through H, according to the first embodiment of the present invention.

| Component | A | B | C | D | E | F | G | H |
|---|---|---|---|---|---|---|---|---|
| $SiO_2$ | 45.4 | 62.00 | 63.0 | 62.0 | 62.0 | 64.0 | 63.0 | 62.0 |
| $Al_2O_3$ | 13.7 | 3.00 | 2.0 | 3.0 | 3.9 | 1.0 | 2.0 | 3.0 |
| $Na_2O$ | 2.2 | 2.60 | 2.5 | 2.5 | 5.5 | 2.5 | 2.5 | 2.5 |
| $K_2O$ | 0.5 | 0.90 | 0.5 | 0.5 | 0.5 | 0.5 | 0.5 | 0.5 |
| MgO | 11.3 | 4.50 | 3.5 | 2.5 | 3.0 | 2.5 | 2.5 | 3.52 |
| CaO | 19.6 | 13.35 | 18.5 | 19.5 | 16.0 | 19.5 | 19.5 | 18.48 |
| $TiO_2$ | 1.4 | 1.90 | 0.2 | 0.2 | 0.2 | 0.2 | 0.2 | 0.2 |
| Total Iron As FeO | 5.4 | 11.75 | 9.8 | 9.8 | 9.8 | 9.8 | 9.8 | 9.8 |
| Liquidus(°F.) | 2251 | 2171 | 2160 | 2158 | 2101 | — | 2196 | 2180 |
| Liquidus(°C.) | 1231 | 1188 | 1182 | 1181 | 1149 | — | 1202 | 1193 |
| Viscosity[1] | 104 | 442 | 328 | 344 | — | — | — | |
| % Shrink[2] | 6 | 3 | — | 4 | — | 11 | 4 | |
| Dissol. Rate[3] | 15 | 42 | — | 42 | — | 107 | 94 | |

[1]Measured in poise at 2250° F. (1230° C.).
[2]Measured at 930° C.
[3]Measured as $ng/cm^2$-hr in a model physiological saline solution at 37° C. with a flow rate of 0.2 mL per minute A standard rockwool's lack of suitability for fiberizing by a rotary process is evidenced from the values given for Composition A. Specifically, Composition A has a liquidus temperature of 2251° F. (1231° C.), which is generally too high to achieve economical results from the typical rotary process now used. Also, Composition A has a viscosity of 104 poise at 2250° F. (1230° C.), which is generally too low to achieve good quality fibers with low shot content. In addition, the dissolution rate of Composition A, 15 $ng/cm^2$-hr, is much lower than desired.

In contrast, Composition B has a liquidus temperature of 2171° F. (1188° C.) and a viscosity of 442 poise at 2250° C., Composition C has a liquidus temperature of 2160° F. (1182° C.) and a viscosity of 328 poise, and Composition D has a liquidus temperature of 2158° F. (1181° C.) and a viscosity of 344 poise, which indicates that Compositions B, C and D should be economically fiberizable, with fairly good fiber quality, using relatively standard rotary fiberization methods. In addition, the high temperature resistances of Compositions B and D compare well with that of Composition A, i.e., 3 and 4 percent linear shrink, respectively, vs. 6 percent linear shrink at 930° C. The percent linear shrink is a measure of fire resistance determined from a standard fire test, with less shrinkage indicating better fire performance. Further, Compositions B and D each has an improved dissolution rate of 42 $ng/cm^2$-hr with respect to Composition A.

It is believed that the temperature resistances of compositions according to the first embodiment of the invention are due to the relatively low alkali, i.e., $Na_2O+K_2O$, contents thereof, and that the relatively low liquidus temperatures thereof are due at least in part to their relatively low MgO contents. In addition, it is believed that the relatively improved dissolution rates of the compositions are due to the low alumina levels thereof. As can be seen from Compositions F and G, these improved dissolution rates can be quite high, i.e., 107 $ng/cm^2$-hr for Composition F, although potentially at some sacrifice of other properties for certain compositions, i.e., the higher liquidus temperature of Composition G. Accordingly, alternative compositions according to a second embodiment of the present invention are desirable in some instances to produce certain combinations of liquidus, viscosity and dissolution rate, while retaining temperature resistance.

Mineral fiber compositions according to a second embodiment of the invention include the following components, in about the indicated weight percents:

| COMPONENT | WEIGHT PERCENT |
|---|---|
| $SiO_2$ | 50–68 |
| $Al_2O_3$ | 0–4 |
| $K_2O$ | 0–6 |
| $Na_2O$ | 0–6 |
| MgO | 0–10 |
| CaO | 10–28 |
| Total Iron as FeO | 6–16 |
| $TiO_2$ | 0–5 |
| $ZrO_2$ | 0.5–12 |
| $Na_2O + K_2O$ | 0–6 |

Preferred ranges for components of the composition according to the second embodiment of the invention are as follows, in about the indicated weight percents:

| COMPONENT | WEIGHT PERCENT |
|---|---|
| $SiO_2$ | 52–66 |
| $Al_2O_3$ | 0–3.5 |
| $K_2O$ | 0–5 |
| $Na_2O$ | 0–5 |
| MgO | 1–8 |
| CaO | 11–25 |
| Total Iron as FeO | 7–15 |
| $TiO_2$ | 0–4 |
| $ZrO_2$ | 1–11 |
| $Na_2O + K_2O$ | 0–5 |

More preferred ranges for components of the composition according to the second embodiment are as follows, in about the indicated weight percents:

| COMPONENT | WEIGHT PERCENT |
|---|---|
| $SiO_2$ | 54–64 |
| $Al_2O_3$ | 0–3.5 |
| $K_2O$ | 0–4.5 |
| $Na_2O$ | 0–4.5 |
| MgO | 1–4 |
| CaO | 12–23 |
| Total Iron as FeO | 7–14 |
| $TiO_2$ | 0–3 |
| $ZrO_2$ | 1–9 |
| $Na_2O + K_2O$ | 0–4.5 |

More preferred ranges for components of the compositions according to the second embodiment of the invention are as follows, in about the indicated weight percents:

| COMPONENT | WEIGHT PERCENT |
|---|---|
| $SiO_2$ | 57–62 |
| $Al_2O_3$ | 0.5–2 |
| $K_2O$ | 0–4 |
| $Na_2O$ | 0–3 |
| MgO | 2–4 |
| CaO | 16–22 |
| Total Iron as FeO | 7–12 |
| $TiO_2$ | 0–2 |
| $ZrO_2$ | 1–5 |
| $Na_2O + K_2O$ | 0–4.5 |

EXAMPLE 2

Specific examples of compositions according to the second embodiment of this invention are shown in the following table with quantities being presented by approximate weight percent of total composition.

| COMPONENT | I | J | K | L | M | N | O | P | Q | R | S |
|---|---|---|---|---|---|---|---|---|---|---|---|
| $SiO_2$ | 60 | 60 | 60 | 56 | 60 | 62 | 62 | 60 | 60.5 | 60.06 | 60 |
| $Al_2O_3$ | 3 | 3 | 2 | 3 | 3 | 3 | 3 | 2 | 0.5 | 1.5 | 1.34 |
| $Na_2O$ | 2.5 | 2.5 | 0.25 | 2.5 | 2.5 | 2.5 | 2.5 | 025 | 4 | 2.5 | 2.5 |
| $K_2O$ | 0.5 | 0.5 | 2.75 | 0.5 | 0.5 | 0.5 | 0.5 | 2.75 | 0.16 | 0.38 | 0.35 |
| MgO | 2.57 | 2.4 | 2.5 | 2.17 | 2.05 | 3.2 | 2.88 | 2 | 3.14 | 3.07 | 3.07 |
| CaO | 19.94 | 18.6 | 19.5 | 16.83 | 15.95 | 16.8 | 15.12 | 18 | 19.86 | 19.43 | 19.43 |
| BaO | 0 | 0 | 0 | 0 | 3.0 | 0 | 0 | 0 | 0 | 0 | 0 |
| $TiO_2$ | 0.2 | 0.2 | 0.2 | 0.2 | 0.2 | 0.2 | 0.2 | 0.2 | 0.06 | 0.06 | 0.06 |
| Total Iron As FeO | 9.8 | 9.8 | 9.8 | 9.8 | 9.8 | 9.8 | 9.8 | 11.8 | 9.75 | 10 | 10 |
| $ZrO_2$ | 1.5 | 3 | 3 | 9 | 3 | 2 | 4 | 3 | 2.03 | 3 | 3.25 |
| Liquidus (° F.) | 2110 | 2137 | 2135 | 2151 | 2091 | 2121 | 2137 | 2117 | 2180 | 2155 | 2150 |
| Liquidus (° C.) | 1154 | 1169 | 1168 | 1177 | 1144 | 1161 | 1169 | 1158 | | | |
| Viscosity[1] | | 366 | | | | | | | | | 254 |
| % Shrink[2] | 41.7 | 12.2 | 5.5 | | | | | | | 7.1 | 163 |
| Dissol Rate[3] | | 44.3 | | | | | | | 144 | 74 | 80 |

[1] Measured in poise at 2250° F. (1232° C.).
[2] Measured at 930° C.
[3] Measured as $ng/cm^2$-hr in a model physiological saline solution at 37° C. with a flow rate of 0.2 mL per minute.

As can be seen by comparing Composition D with Composition J, the compositions are very similar, with Composition J having 3 percent $ZrO_2$ substituted for 2 percent $SiO_2$ and 1 percent CaO in Composition D. As can further be seen, this addition of $ZrO_2$ in Composition J produces a moderate reduction in the liquidus temperature of that composition as compared to Composition D, and a moderate increase in viscosity at 2250° F. Both changes are desirable, to improve the economics and fiber quality of rotary fiberization, respectively. As can also be seen, Composition J has a dissolution rate which is comparable to that of Composition D, and a temperature resistance that is relatively good.

The percent linear shrink of Composition I was measured and was determined to be 41.7%. This is a high rate of linear shrinkage when compared with the linear shrinkages for Compositions D and J. The high rate of linear shrinkage of Composition I can be attributed to both its $SiO_2$ concentration and its $ZrO_2$ concentration. The formulation of Composition I includes 2% less $SiO_2$ and 1.5% more $ZrO_2$ than Composition D. Also, Composition I has the same percentage of $SiO_2$ but 1.5% less $ZrO_2$ than Composition J. The relatively high linear shrinkage for Composition I indicates that, for that particular composition, while maintaining the other components relatively constant, the addition of only 1.5% $ZrO_2$ does not sufficiently make up for the high temperature resistance which is lost when 2% of $SiO_2$ is removed from the composition. However, as can be seen from comparing Composition D with Composition J, the addition of 3% of $ZrO_2$ substituted for the 2% loss of $SiO_2$ does adequately make up for the high temperature resistance which is lost when the $SiO_2$ is removed.

The biosolubility of Composition J, while much improved relative to a standard rockwool such as Composition A, is still lower than achieved by a more preferred embodiment of the invention. An increase in such biosolubility as a result of a decrease in $Al_2O_3$ content can be seen by comparing Composition J with Compositions R and S. Compositions R and S are similar to Composition J, with roughly 1.5 percent $Al_2O_3$ replaced with roughly 1.5 percent CaO and MgO, collectively. Compositions R and S have dissolution rates in a model physiological saline solution, at 37° C. with a flow rate of 0.2 mL per minute, of 74 and 80 $ng/cm^2$-hr, respectively, as compared with 42 and 44.3 $ng/cm^2$-hr, respectively, for Compositions D and J. Compositions R and S also have relatively good high temperature resistance, and liquidus temperatures similar to that of Composition D. The viscosity of Composition S also is in a range that should allow for relatively good fiber quality in a rotary fiberizing process (the viscosity of Composition R has not been tested, but is expected to also be within an acceptable range). For these reasons, Compositions R and S are at this time the most preferred embodiments of the present invention.

As stated above, the compositions of this invention can be formed into mineral wool fibers by a rotary fiberizing apparatus. If used to create an insulation product, the fibers can be coated with a binder to hold the insulation product together. The fibers can also be coated with lubricating agents, wetting agents, antistatic agents and extenders or stabilizers. Typically, the fibers are coated as they are attenuated from the fiberizing apparatus. However, one skilled in the art will appreciate that the fibers can be coated at any time in the insulation formation process. Once the fibers have been attenuated from the fiberizing apparatus, the fibers are typically collected on a porous conveyor belt or other collection apparatus to be formed into an insulation product.

Although the compositions of this invention have been described above as being primarily useful in mineral wool insulation products, one skilled in the art will understand that the compositions of this invention can be used to form mineral fibers useful in other applications than insulation. For example, fibers formed from the compositions of this invention can also be used to form air handling ducts, ceiling panels and acoustical panels.

While certain representative embodiments and details have been shown for purposes of illustrating the invention, it will be apparent to those of skill in the art that various changes and modifications can be made to the compositions of this invention without departing from the scope of the invention, which is defined in the appended claims.

What is claimed is:

1. A mineral fiber composition consisting essentially of the following components, indicated in weight percents:

about 54 to about 70 percent $SiO_2$, about 0 to about 4 percent $Al_2O_3$, about 0 to about 6 percent $Na_2O$, about 0 to about 6 percent $K_2O$, about 0 to about 6 percent MgO, about 10 to about 28 percent CaO, about 6 to about 17 percent total iron as FeO, and about 0 to about 5 percent $TiO_2$, wherein the total weight percent of $SiO_2$ and $Al_2O_3$ ranges from about 56 percent to about 72 percent, the total weight percent of MgO and CaO ranges from about 12 percent to about 28 percent, the total weight percent of $Na_2O$ and $K_2O$ does not exceed 6 percent, the total weight percent of $Al_2O_3$ and FeO is not less than 12.8 percent, and the total weight percent of all components, including trace elements, if any, is 100 percent.

2. The mineral fiber composition according to claim 1, consisting essentially of the following components indicated in weight percents:

about 56 to about 68 percent $SiO_2$, about 0 to about 3 percent $Al_2O_3$, about 0 to about 5 percent $Na_2O$, about 0 to about 5 percent $K_2O$, about 1 to about 6 percent MgO, about 10 to about 25 percent CaO, about 8 to about 16 percent total iron as FeO, and about 0 to about 4 percent $TiO_2$, wherein the total weight percent of $SiO_2$ and $Al_2O_3$ ranges from about 58 percent to about 71 percent, the total weight percent of MgO and CaO ranges from about 14 percent to about 26 percent, the total weight percent of $Na_2O$ and $K_2O$ does not exceed 5 percent, and the total weight percent of all components, including trace elements, if any, is 100 percent.

3. The mineral fiber composition according to claim 1, consisting essentially of the following components indicated in weight percents:

about 58 to about 65 percent $SiO_2$, about 0 to about 3 percent $Al_2O_3$, about 0 to about 4 percent $K_2O$, about 0 to about 4 percent $Na_2O$, about 2 to about 5 percent MgO, about 11 to about 20 percent CaO, about 9 to about 13 percent total iron as FeO, and about 0 to about 3 percent $TiO_2$, wherein the total weight percent of $SiO_2$ and $Al_2O_3$ ranges from about 60 percent to about 68 percent, the total weight percent of MgO and CaO ranges from about 17 percent to about 22 percent, the total weight percent of $Na_2O$ and $K_2O$ does not exceed 4 percent, and the total weight percent of all components, including trace elements, if any, is 100 percent.

4. The mineral fiber composition according to claim 1, consisting essentially of the following components in the indicated weight percents:

about 62 percent $SiO_2$, about 3 percent $Al_2O_3$, about 2.6 percent $K_2O$, about 0.9 percent $Na_2O$, about 4.5 percent MgO, about 13.4 percent CaO, about 1.9 percent $TiO_2$, and about 11.7 percent total iron as FeO.

5. The mineral fiber composition according to claim 1, consisting essentially of the following components in the indicated weight percents:

about 62 percent $SiO_2$, about 3 percent $Al_2O_3$, about 2.5 percent $Na_2O$, about 0.5 percent $K_2O$, about 2.5 percent MgO, about 19.5 percent CaO, about 0.2 percent $TiO_2$, and about 9.8 percent total iron as FeO.

6. The mineral fiber composition according to claim 1, consisting essentially of the following components in the indicated weight percents:

about 63 percent $SiO_2$, about 3 percent $Al_2O_3$, about 5.5 percent $Na_2O$, about 0.5 percent $K_2O$, about 3 percent MgO, about 16 percent CaO, about 0.2 percent $TiO_2$, and about 9.8 percent total iron as FeO.

7. The mineral fiber composition according to claim 1, consisting essentially of the following components in the indicated weight percents:

about 64 percent $SiO_2$, about 1 percent $Al_2O_3$, about 2.5 percent $Na_2O$, about 0.5 percent $K_2O$, about 2.5 percent MgO, about 19.5 percent CaO, about 0.2 percent $TiO_2$, and about 9.8 percent total iron as FeO.

8. The mineral fiber composition of claim 1, consisting essentially of the following components in the indicated weight percents:

about 63 percent $SiO_2$, about 2 percent $Al_2O_3$, about 2.5 percent $Na_2O$, about 0.5 percent $K_2O$, about 2.5 percent MgO, about 19.5 percent CaO, about 0.2 percent $TiO_2$, and about 9.8 percent total iron as FeO.

9. The mineral fiber composition according to claim 1, wherein the composition has a liquidus temperature below about 2200° F. (1204° C.) and a viscosity which ranges between about 100 and about 1000 poise at 2250° F. (1232° C.).

10. Mineral wool insulation comprising mineral fibers having the composition of claim 1.

11. A mineral fiber composition consisting essentially of the following components in the indicated weight percents:

about 63 percent $SiO_2$, about 2 percent $Al_2O_3$, about 2.5 percent $Na_2O$, about 0.5 percent $K_2O$, about 3.5 percent MgO, about 18.5 percent CaO, about 0.2 percent $TiO_2$, and about 9.8 percent total iron as FeO.

12. A mineral fiber composition consisting essentially of the following components, indicated in weight percents:

about 50 to about 68 percent $SiO_2$, about 0 to about 4 percent $Al_2O_3$, about 0 to about 6 percent $K_2O$, about 0 to about 6 percent $Na_2O$, about 0 to about 10 percent MgO, about 10 to about 28 percent CaO, about 6 to about 16 percent total iron as FeO, about 0 to about 5 percent $TiO_2$, and about 0.5 to about 12 percent $ZrO_2$, wherein the total weight of $Na_2O$ and $K_2O$ does not exceed 6 percent and the total weight of all components, including trace elements, if any, is 100 percent.

13. The mineral fiber composition according to claim 12, consisting essentially of the following components indicated in weight percents:

about 52 to about 66 percent $SiO_2$, about 0 to about 3.5 percent $Al_2O_3$, about 0 to about 5 percent $K_2O$, about 0 to about 5 percent $Na_2O$, about 1 to about 8 percent MgO, about 11 to about 25 percent CaO, about 7 to about 15 percent total iron as FeO, about 0 to about 4 percent $TiO_2$, and about 1 to about 11 percent $ZrO_2$, wherein the total weight of $Na_2O$ and $K_2O$ does not exceed 5 percent and the total weight of all components, including trace elements, if any, is 100 percent.

14. The mineral fiber composition according to claim 12, consisting essentially of the following components indicated in weight percents:

about 54 to about 64 percent $SiO_2$, about 0 to about 3.5 percent $Al_2O_3$, about 0 to about 4.5 percent $K_2O$, about 0 to about 4.5 percent $Na_2O$, about 1 to about 4 per MgO, about 12 to about 23 percent CaO, about 7 to about 14 percent total iron as FeO, about 0 to about 3 percent $TiO_2$, and about 1 to about 9 percent $ZrO_2$, wherein the total weight of $Na_2O$ and $K_2O$ does not exceed 4.5 percent and the total weight of all components, including trace elements, if any, is 100 percent.

15. The mineral fiber composition according to claim 12, consisting essentially of the following components indicated in weight percents:

about 57 to about 62 percent $SiO_2$, about 0.5 to about 2.0 percent $Al_2O_3$, about 0 to about 4 percent $K_2O$, about 0 to about 3 percent $Na_2O$, about 2 to about 4 percent MgO, about 16 to about 22 percent CaO, about 7 to about 12 percent total iron as FeO, about 0 to about 2 percent $TiO_2$, about 1 to about 5 percent $ZrO_2$, wherein the total weight of $Na_2O+K_2O$ does not exceed 4.5 percent and the total weight of all components, including trace elements, if any, is 100 percent.

16. The mineral fiber composition according to claim 12, consisting essentially of the following components indicated in weight percents:

about 60 percent $SiO_2$, about 3 percent $Al_2O_3$, about 2.5 percent $Na_2O$, about 0.5 percent $K_2O$, about 2.6 percent MgO, about 19.9 percent CaO, about 0.2 percent $TiO_2$, about 9.8 percent total iron as FeO and about 1.5 percent $ZrO_2$.

17. The mineral fiber composition according to claim 12, consisting essentially of the following components indicated in weight percents:

about 60 percent $SiO_2$, about 3 percent $Al_2O_3$, about 2.5 percent $Na_2O$, about 0.5 percent $K_2O$, about 2.4 percent MgO, about 18.6 percent CaO, about 0.2 percent $TiO_2$, about 9.8 percent total iron as FeO and about 3 percent $ZrO_2$.

18. The mineral fiber composition according to claim 12, consisting essentially of the following components indicated in weight percents:

about 60 percent $SiO_2$, about 2 percent $Al_2O_3$, about 0.25 percent $Na_2O$, about 2.75 percent $K_2O$, about 2.5 percent MgO, about 19.5 percent CaO, about 0.2 percent $TiO_2$, about 9.8 percent total iron as FeO and about 3 percent $ZrO_2$.

19. The mineral fiber composition according to claim 12, consisting essentially of the following components indicated in weight percents:

about 56 percent $SiO_2$, about 3 percent $Al_2O_3$, about 2.5 percent $Na_2O$, about 0.5 percent $K_2O$, about 2.2 percent MgO, about 16.8 percent CaO, about 0.2 percent $TiO_2$, about 9.8 percent total iron as FeO and about 9 percent $ZrO_2$.

20. The mineral fiber composition according to claim 12, consisting essentially of the following components, indicated in weight percents:

about 60 percent $SiO_2$, about 3 percent $Al_2O_3$, about 2.5 percent $Na_2O$, about 0.5 percent $K_2O$, about 2.1 percent MgO, about 16 percent CaO, about 0.2 percent $TiO_2$, about 9.8 percent total iron as FeO, and about 3 percent $ZrO_2$, and further including about 3 percent BaO.

21. The mineral fiber composition according to claim 12, consisting essentially of the following components indicated in weight percents:

about 62 percent $SiO_2$, about 3 percent $Al_2O_3$, about 2.5 percent $Na_2O$, about 0.5 percent $K_2O$, about 3.2 percent MgO, about 16.8 percent CaO, about 0.2 percent $TiO_2$, about 9.8 percent total iron as FeO and about 2 percent $ZrO_2$.

22. The mineral fiber composition according to claim 12, consisting essentially of the following components indicated in weight percents:

about 62 percent $SiO_2$, about 3 percent $Al_2O_3$, about 2.5 percent $Na_2O$, about 0.5 percent $K_2O$, about 2.9 percent MgO, about 15.1 percent CaO, about 0.2 percent $TiO_2$, about 9.8 percent total iron as FeO and about 4 percent $ZrO_2$.

23. The mineral fiber composition according to claim 12, consisting essentially of the following components indicated in weight percents:

about 60 percent $SiO_2$, about 2 percent $Al_2O_3$, about 0.25 percent $Na_2O$, about 2.75 percent $K_2O$, about 2 percent MgO, about 18 percent CaO, about 0.2 percent $TiO_2$, about 11.8 percent total iron as FeO and about 3 percent $ZrO_2$.

24. The mineral fiber composition according to claim 12, consisting essentially of the following components indicated in weight percents:

about 60.5 percent $SiO_2$, about 0.5 percent $Al_2O_3$, about 4 percent $Na_2O$, about 0.2 percent $K_2O$, about 3.1 percent MgO, about 19.9 percent CaO, about 0.06 percent $TiO_2$, about 9.75 percent total iron as FeO and about 2 percent $ZrO_2$.

25. The mineral fiber composition according to claim 12, consisting essentially of the following components indicated in weight percents:

about 60 percent $SiO_2$, about 1.5 percent $Al_2O_3$, about 2.5 percent $Na_2O$, about 0.4 percent $K_2O$, about 3.1 percent MgO, about 19.4 percent CaO, about 0.06 percent $TiO_2$, about 10 percent total iron as FeO and about 3.0 percent $ZrO_2$.

26. The mineral fiber composition according to claim 12, consisting essentially of the following components indicated in weight percents:

about 60 percent $SiO_2$, about 1.3 percent $Al_2O_3$, about 2.5 percent $Na_2O$, about 0.4 percent $K_2O$, about 3.1 percent MgO, about 19.4 percent CaO, about 0.06 percent $TiO_2$, about 10 percent total iron as FeO and about 3.3 percent $ZrO_2$.

27. Mineral wool insulation comprising mineral fibers having the composition of claim 12.

* * * * *